United States Patent [19]

Teramachi

[11] Patent Number: 4,531,788

[45] Date of Patent: Jul. 30, 1985

[54] LINEAR SLIDE BEARING

[76] Inventor: Hiroshi Teramachi, 2-34-8, Higashi-Tamagawa, Setagaya-Ku, Tokyo, Japan

[21] Appl. No.: 604,113

[22] Filed: Apr. 26, 1984

[30] Foreign Application Priority Data

May 10, 1983 [JP] Japan .................................. 58-80024
May 13, 1983 [JP] Japan .................................. 58-83827

[51] Int. Cl.³ ............................................ F16C 29/06
[52] U.S. Cl. .................................................. 308/6 C
[58] Field of Search ...................... 308/6 C, 6 R, 6 A; 464/168

[56] References Cited

U.S. PATENT DOCUMENTS

| | | | |
|---|---|---|---|
| 4,240,673 | 12/1980 | Ernst et al. | 308/6 C |
| 4,391,473 | 7/1983 | Teramachi | 308/6 C |
| 4,441,765 | 4/1984 | Kasai et al. | 308/6 C |
| 4,475,776 | 10/1984 | Teramachi | 308/6 C |

Primary Examiner—Lenard A. Footland

[57] ABSTRACT

A linear slide bearing for use in, for example, machining center has an integral main body with a channel-like cross-section constituted by left and right skirt portions and a central cavity formed between the skirt portions, the main body having a pair of race receiving grooves formed in the opposing surfaces of the skirt portions confronting the central cavity and non-loaded ball grooves disposed near both ends of respective race-receiving grooves and communicating with the race-receiving grooves. The linear slide bearing further has a pair of bearing races constituted by arcuate members having a semi-circular cross-section, each of said bearing races being provided in its inner surface with a pair of loaded ball grooves.

13 Claims, 23 Drawing Figures

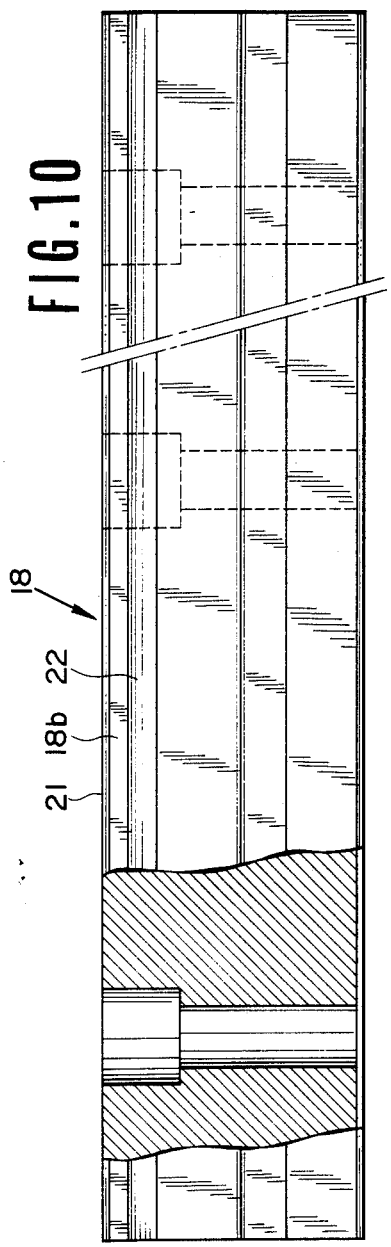
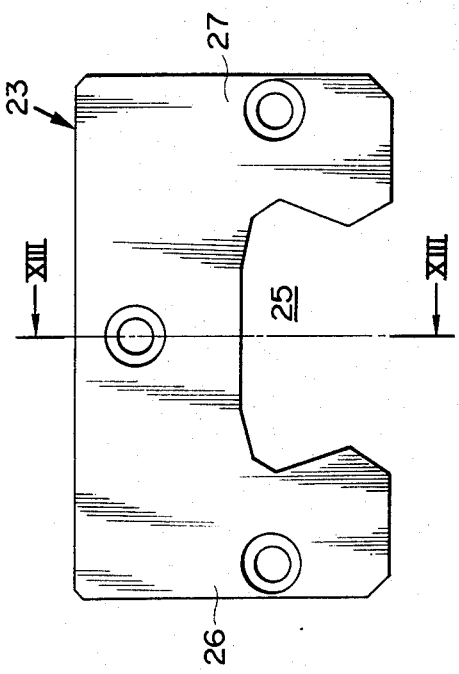
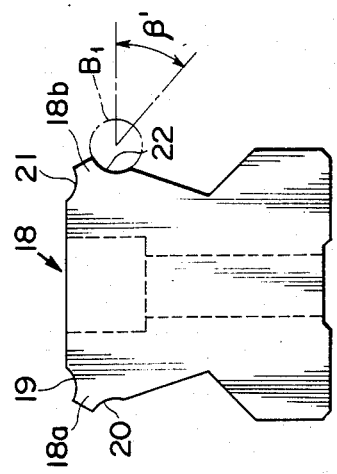

LINEAR SLIDE BEARING

BACKGROUND OF THE INVENTION

The present invention relates to a linear slide bearing suitable for use in various sliding parts such as the table saddle of a machine tool, the slider of a machining center and the slider of a transportation robot for reciprocative transportation of a heavy object.

Generally, a conventional linear slide bearing incorporates bearing races as essential parts thereof. This bearing race, usually made of a flat plate member, is liable to be distorted and twisted when it bears a load, resulting in an unsmoothed recirculation of balls running along the bearing race, due to variation of contact pressure between the ball and the bearing race along the length of the bearing race. The bearing race is usually fixed by means of screws. Therefore, a troublesome work is required to fix the bearing race by the screws, particularly when the bearing race has to be fixed at many points. The fixing of the bearing race by means of screws is disadvantageous in that quite a delicate adjustment of screw tightening force is required in order to correctly locate and mount the bearing race.

Another problem encountered by the conventional linear slide bearing arises from the difficulty in the formation of non-loaded ball grooves in the main body of the bearing. In the production of the conventional linear slide bearings, the non-loaded ball grooves are formed in the main body of the bearing by drilling. It is extremely difficult to form the non-loaded ball grooves in the aimed portions of the main body of the bearing directly by drilling. This difficulty not only impairs the precision of machining but also raises the production cost due to a too long time required for the drilling.

SUMMARY OF THE INVENTION

Under these recircumstances, the invention aims as its primary object at overcoming the above-described problems of the prior art.

Accordingly, it is an object of the invention to provide a linear slide bearing in which each bearing race is made of an arcuate member having a semi-circular cross-section to exhibit a sufficiently large resistance to twisting force thereby to ensure a smooth recirculation of the balls.

It is another object of the invention to provide a linear slide bearing in which each bearing race can be mounted easily and precisely simply by being fixed at its both ends to corresponding fixing surfaces provided on the inner surfaces of the end covers.

It is still another object of the invention to provide a linear slide bearing which is improved to permit the formation of the non-loaded ball grooves by a simple grinding, thereby to reduce the production cost of the bearing main body and, hence, the production cost of the bearing unit as a whole.

To these ends, according to an aspect of the invention, there is provided a linear slide bearing comprising: an integral main body with a channel-like cross-section constituted by left and right skirt portions and a central cavity formed between the skirt portions, the main body having a pair of race receiving grooves formed in the opposing surfaces of the skirt portions confronting the central cavity and non-loaded ball grooves disposed near both ends of respective race-receiving grooves and communicating with the race-receiving grooves; a pair of bearing races constituted by arcuate members having a semi-circular cross-section, each bearing races being provided in its inner surface with a pair of loaded ball grooves; a track shaft received in the central cavity of the main body and provided at its both shoulder portions with ribs extending along the length thereof, the track shaft being provided at the upper and lower sides of each rib with loaded ball grooves corresponding to the loaded ball grooves in the adjacent bearing race; a pair of end covers adapted to be attached to both longitudinal ends of the main body so as to straddle the track shaft, each of the end cover being provided in its inner surface with ball turning grooves for connecting the loaded ball grooves in the bearing races and in the track shaft to corresponding non-loaded ball grooves in the main body, and race retaining grooves for retaining adjacent ends of the bearing races; and balls adapted to be recirculated through endless ball passages constituted by loaded ball passages formed by the loaded ball grooves in the bearing races and the track shaft, non-loaded ball passages presented by the non-loaded ball grooves in the main body and the ball turning grooves formed in respective end covers.

According to another aspect of the invention, there is provided a linear slide bearing comprising: an integral main body with a channel-like cross-section constituted by left and right skirt portions and a central cavity formed between the skirt portions, the main body having a pair of race receiving grooves formed in the opposing surfaces of the skirt portions confronting the central cavity and non-loaded ball grooves disposed near both ends of respective race-receiving grooves and communicating with the race-receiving grooves; a pair of bearing races constituted by arcuate members having a semi-circular cross-section, each bearing races being provided in its inner surface with a pair of loaded ball grooves; a track shaft received in the central cavity of the main body and provided at its both shoulder portions with ribs extending along the length thereof, the track shaft being provided at the upper and lower sides of each rib with loaded ball grooves corresponding to the loaded ball grooves in the adjacent bearing race; a pair of end covers adapted to be attached to both longitudinal ends of the main body so as to straddle the track shaft, each of the end cover being provided in its inner surface with ball turning grooves for connecting the loaded ball grooves in the bearing races and in the track shaft to corresponding non-loaded ball grooves in the main body, and race retaining grooves for retaining adjacent ends of the bearing races; and balls adapted to be recirculated through endless ball passages constituted by loaded ball passages formed by the loaded ball grooves in the bearing races and the track shaft, non-loaded ball passages presented by the non-loaded ball grooves in the main body and the ball turning grooves formed in respective end covers; wherein, at each side of the main body, one of the non-loaded ball grooves and the loaded ball grooves associated therewith are arranged in symmetry with the other of the non-loaded ball grooves and the loaded ball grooves associated therewith, with respect to a reference line which coincides with the line of force acting on the track shaft.

According to still another aspect of the invention, there is provided a linear slide bearing comprising: an integral main body with a channel-like cross-section constituted by left and right skirt portions depending from a solid portion and a central cavity formed between the skirt portions, the main body having a pair of race receiving grooves formed in the opposing surfaces of the skirt portions and opening to the central cavity, and non-loaded ball passages constituted by bores formed in the solid portion of the main body; a pair of bearing races constituted by arcuate members having a semi-circular cross-section, each bearing races being provided in its inner surface with a pair of loaded ball grooves; a track shaft received in the central cavity of the main body and provided at its both shoulder portions with ribs extending along the length thereof, the track shaft being provided at the upper and lower sides of each rib with loaded ball grooves corresponding to the loaded ball grooves in the adjacent bearing race; a pair of end covers adapted to be attached to both longitudinal ends of the main body so as to straddle the track shaft, each of the end cover being provided in its inner surface with ball turning grooves for connecting the loaded ball grooves in the bearing races and in the track shaft to corresponding non-loaded ball grooves in the main body, and race retaining grooves for retaining adjacent ends of the bearing races; and balls adapted to be recirculated through endless ball passages constituted by loaded ball passages formed by the loaded ball grooves in the bearing races and the track shaft, non-loaded ball passages presented by the non-loaded ball grooves in the main body and the ball turning grooves formed in respective end covers.

These and other objects, features and advantages of the invention will become clear from the following description of the preferred embodiments taken in conjunction with the accompanying drawings.

BRIEF DESCRIPTION OF THE DRAWINGS

FIG. 10 is a side elevational view of a track shaft;

FIG. 11 is a front elevational view of the track shaft;

FIG. 12 is an end view of the end cover;

DESCRIPTION OF THE PREFERRED EMBODIMENTS

Figure 1:
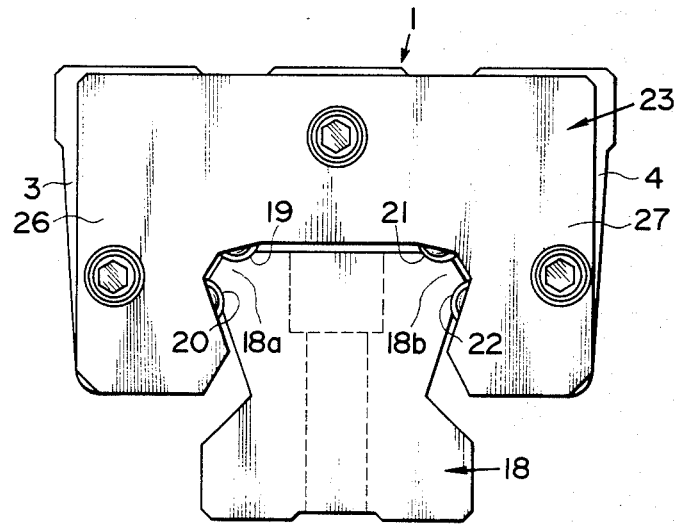
FIG. 1 is a front elevational view of a linear slide bearing in accordance with the present invention.

Preferred embodiments will be described hereinunder with specific reference to the accompanying drawings.

A linear slide bearing in accordance with the invention has a main body generally designated at a reference numeral 1. The main body 1 is an integral member having a channel-like cross-section constituted by left and right skirt portions 3 and 4 opposing to each other and defining therebetween a substantially rectangular central cavity 2.

Figure 2:
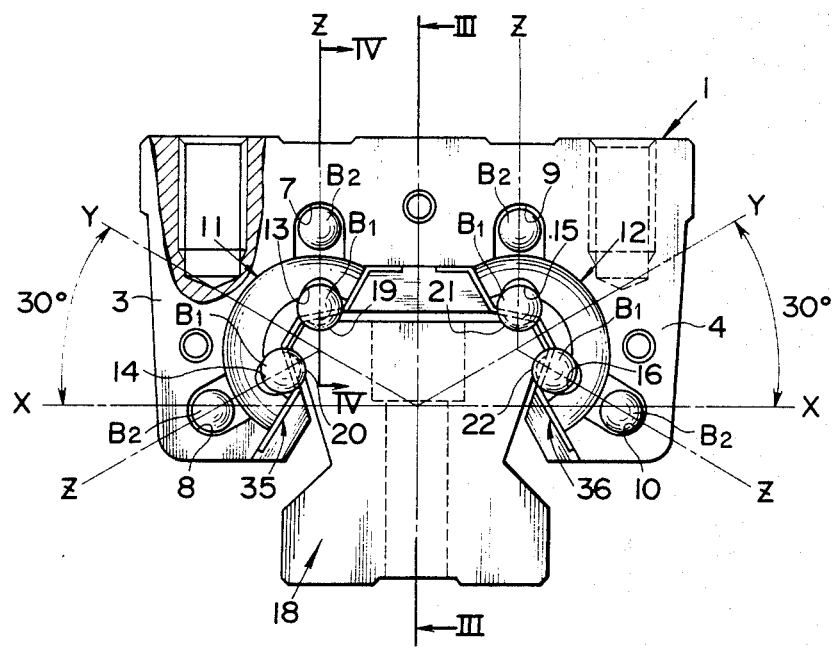
FIG. 2 is a front elevational view of the linear slide bearing with one of the end covers thereof removed.
Figure 3:
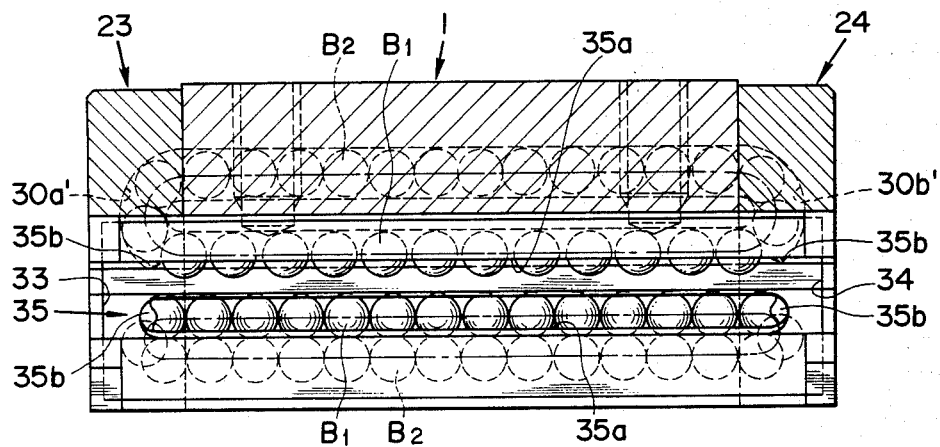
FIG. 3 is a sectional view taken along the line III—III of FIG. 2, with the track shaft thereof being omitted.
Figure 4:
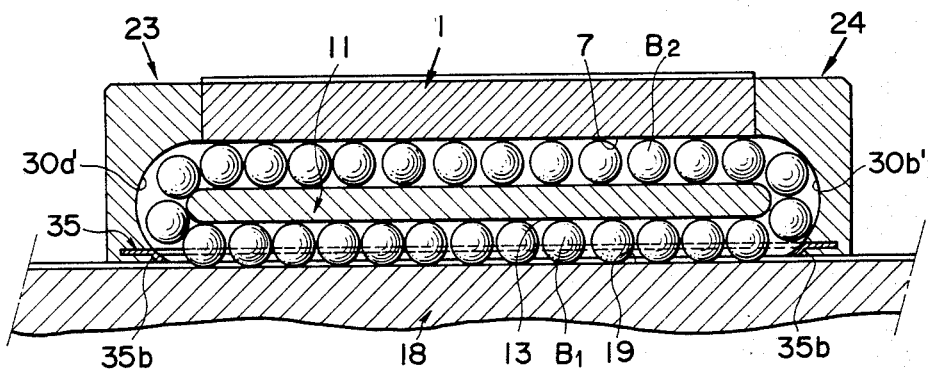
FIG. 4 is a sectional side elevational view taken along the line IV—IV of FIG. 2.
Figure 5:
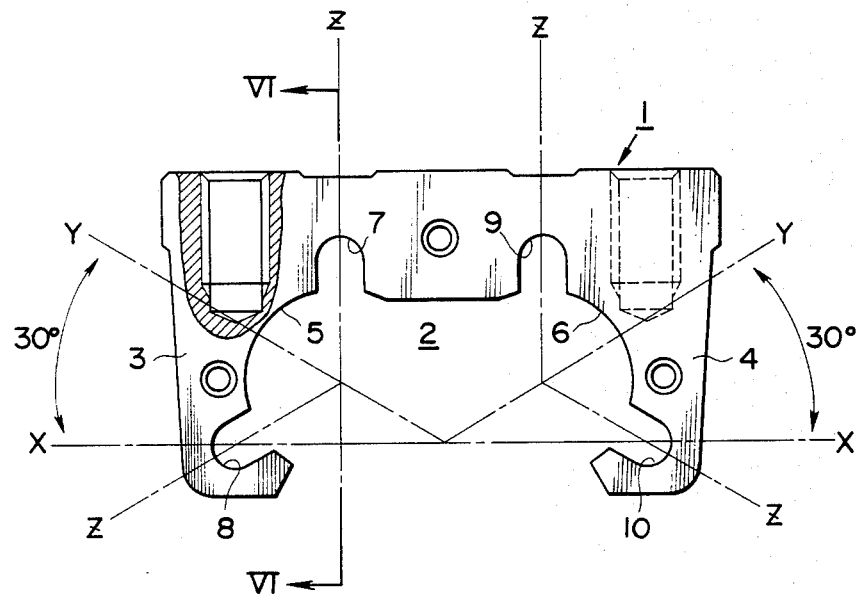
FIG. 5 is a front elevational view of the main body of the linear slide bearing.
Figure 6:
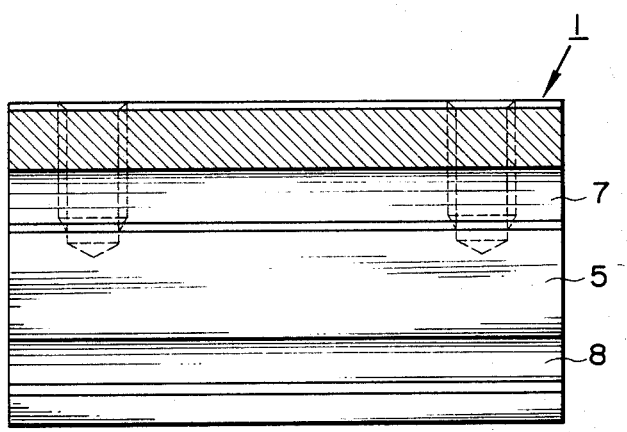
FIG. 6 is a sectional side elevational view taken along the line VI—VI of FIG. 5.
Figure 7:
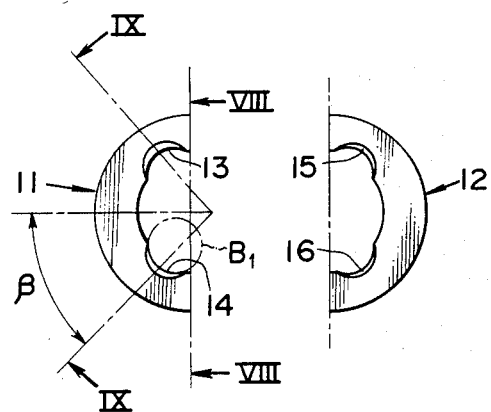
FIG. 7 is a front elevational view showing a pair of bearing races.
Figure 8:
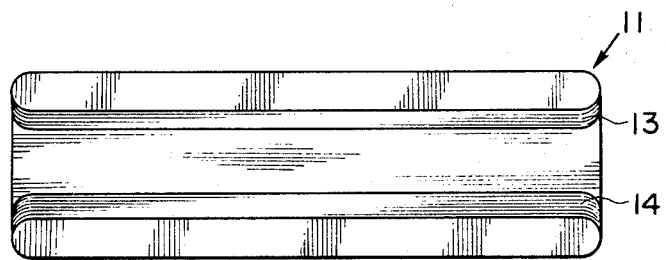
FIG. 8 is a side elevational view of the bearing race as viewed in the direction of line VIII—VIII.
Figure 9:
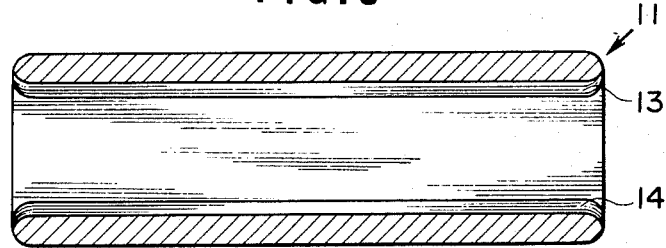
FIG. 9 is an obliquely cut sectional view of the bearing race taken along the line IX—IX of FIG. 7.
Figure 13:
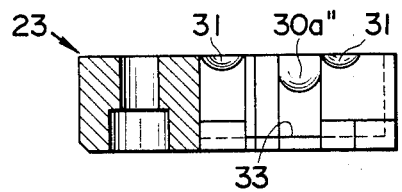
FIG. 13 is a sectional view taken along the line XIII—XIII of FIG. 12.

As will be best seen from FIG. 5, race-receiving grooves 5 and 6, each having a substantially semi-circular cross-section, are formed in the opposing surfaces of the skirt portions 3 and 4 in symmetry with each other with respect to the vertical plane containing the longitudinal axis of the main body 1. Non-loaded ball grooves 7 and 8 having a curvature substantially equal to that of the ball are formed in the main body at both sides of the race-receiving groove 5 so as to extend in the axial direction of the main body 1 over the entire length of the latter. Similarly, non-loaded ball grooves 9 and 10 having a curvature substantially equal to that of the ball are formed at both sides of the race-receiving groove 6. Assuming reference lines Y—Y which intersect the line X—X of force acting on a later-mentioned track shaft at an angle 30° as shown in FIGS. 2 and 5, the non-loaded grooves 7 to 10 are disposed on lines Z—Z which intersect the reference lines Y—Y at angle of 60°.

The main body 1 of the bearing is formed from a light-weight material such as a synthetic resin. The light-weight bearing body 1 effectively decreases the intertia and, therefore, can suitably be used for the linear slide bearing which is required to move at a high speed through repetitional start and stop.

A pair of bearing races 11 and 12, each being an arcuate member having a semi-circular cross-section, are adapted to be received in the race-receiving grooves 5 and 6 formed in the main body 1. As shown in FIGS. 2 and 7 through 9, loaded ball grooves 13 to 16 corresponding to the non-loaded ball grooves 7 to 10 are formed in the inner surfaces of the bearing races 11 and 12 so as to extend in the axial direction of the main body 1. Thus, the loaded ball grooves 13 to 16 are disposed in symmetry with respect to the axis of the main body 1, on the aforementioned lines Z which intersect the reference lines Y—Y at 60°, the reference lines Y—Y themselves intersecting the line X—X of force acting on the track shaft 18 at 30°. Balls $B_1$ under the load contact the surfaces of the corresponding loaded ball grooves 13 to 16 at a contact angle $\beta$ which is 45° (see FIG. 7). Consequently, the area of contact between the surface of each ball and the surface of the associated loaded ball groove, afforded by elastic deformation of the ball and the groove, is increased to reduce the level of the load born by the unit area of the contact region thereby to increase the load capacity of the linear slide bearing as a whole.

Each of the loaded ball grooves 13 to 16 is constituted by a groove having an arcuate cross-section of a radius of curvature which is about a half of that of the ball. Therefore, each loaded ball can make contact with the surface of the associated loaded ball groove at two points when the ball is preloaded or when it carries a load in any direction so that it can roll in good manner without making any slip on the surface of the loaded ball groove. Thanks to the contact at two points between the loaded ball groove and the loaded ball, the ball under a heavy load can make an elastic contact to provide a large contact width to increase the rigidity of the linear slide bearing. Since the loaded balls are arranged to roll along four rows of loaded ball grooves in contact with these grooves at two points at an apropriate angle of contact, the balls are allowed to make elastic deformation even if there is a slight error or offset in the mounting plane. Thus, the linear slide bearing of the invention can absorb slight mounting error or offset to ensure a smooth sliding motion of the main body of the bearing.

The track shaft 18 is received by the central cavity 2 of the main body 1 and is fixed to a movable or a stationary part of a machine such as a machine tool by means of bolts or other suitable fixing means. As will be seen from FIGS. 2, 10 and 11, the track shaft 18 is provided at its both shoulders with left and right ribs 18a and 18b. Axially extending loaded balls grooves 19 to 22 corresponding to the loaded ball grooves 13 to 16 in the bearing races 11 and 12 are formed at the upper and lower sides of the ribs 18a and 18b as illustrated. Thus, the loaded ball grooves 19 to 22 in the track shaft 18 cooperate with corresponding loaded ball grooves 13 to 16 in the bearing races 11 and 12 in defining four rows of linear ball passages. As in the case of the loaded ball grooves 13 to 16 in the bearing races 11 and 12, the loaded ball grooves 19 to 22 in the track shaft 18 have an arcuate cross-section of a radius of curvature which is substantially half of that of the ball. In addition, the loaded ball grooves 19 to 22 in the track shaft 18 are arranged to make contact with the loaded balls $B_1$ at a contact angle $\beta'$ of 45° to increase the load carrying capacity, as in the case of the loaded ball grooves 19 to 22 in the bearing races 11 and 12.

A plurality of balls B are recirculated through endless ball passages constituted by the aforementioned loaded ball passages, non-loaded ball passages presented by the non-loaded ball grooves in the mainbody 1, and ball turning grooves which will be mentioned later. Among these balls, the balls residing in the loaded ball passages will be referred to as the loaded balls $B_1$, while the balls in the non-loaded ball passages are referred to as the non-loaded balls $B_2$. Thus, each ball can be identified as a loaded ball when the same is in the loaded ball passage and as a non-loaded ball when the same is in the non-loaded ball passage.

Figure 14:
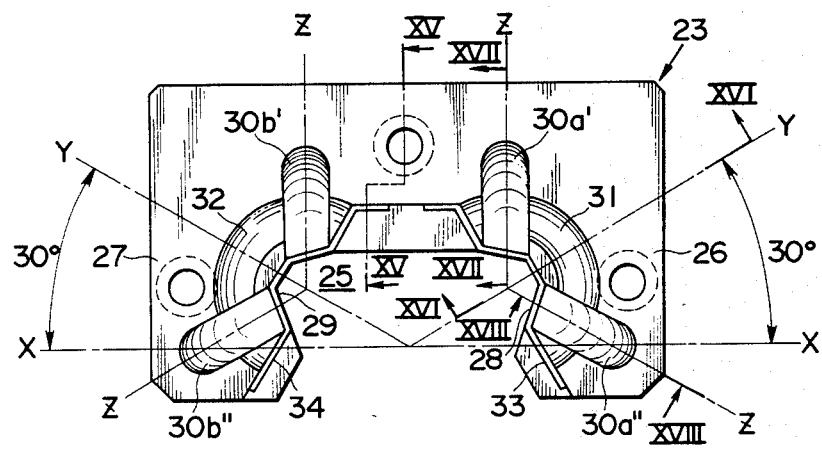
FIG. 14 is a view showing the inner surface of the end cover.
Figure 15:
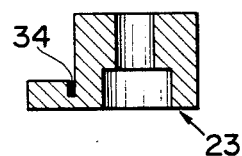
FIG. 15 is a sectional end view taken along the line XV—XV of FIG. 14.
Figure 16:
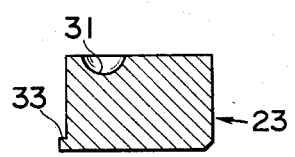
FIG. 16 is an obliquely cut sectional view taken along the line XVI—XVI of FIG. 14.
Figure 17:
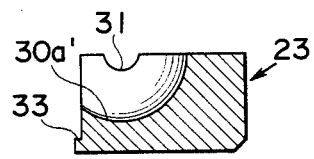
FIG. 17 is an obliquely cut sectional view taken along the line XVII—XVII of FIG. 14.
Figure 18:
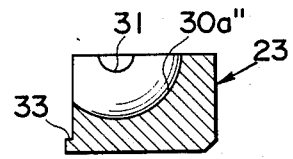
FIG. 18 is an obliquely cut sectional view taken along the line XVIII—XVIII of FIG. 14.
Figure 19:
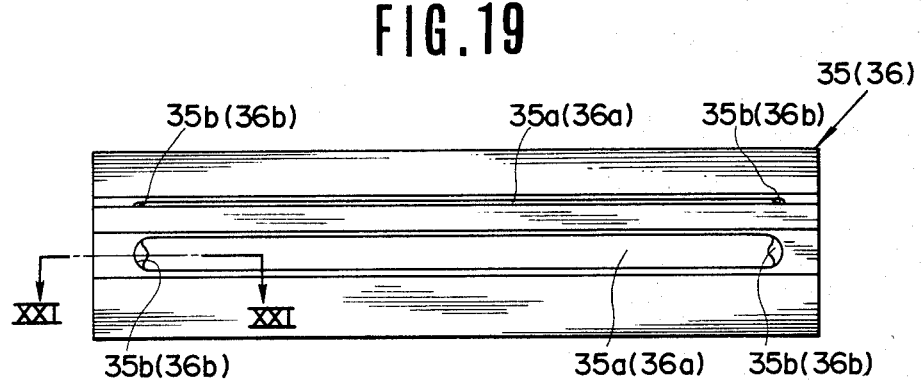
FIG. 19 is a side elevational view of a retainer.

Reference numerals 23 and 24 designate end covers which are attached to both longitudinal ends of the main body 1 of the bearing by bolts or other suitable fixing means. The end covers are made from a synthetic resin or a die cast alloy by injection molding or die casting. Since both end covers have an identical construction, the construction of one 23 of the end covers will be explained with reference to FIGS. 12 to 18. The end cover 23 is a tabular member having a substantially channel-like cross-section in the plane perpendicular to the axis of the track shaft 18. Namely, the end cover 23 has left and right skirt portions 26 and 27 defining therebetween a substantially rectangular central cavity 25. Symmetric recesses 28 and 29 are formed in the opposing surfaces of both skirt portions 26 and 27. The central cavity 25 of the end cover 23, therefore, has a configuration which well approximates that of the central cavity 2 of the main body 1 of the bearing. As will be clearly seen from FIG. 14, the inner surface of the end cover 23 has recesses which are recessed towards the outer surface of the same. These recesses constitute ball turning grooves 30a', 30a'', 30b' and 30b''. A detailed description will be made hereinunder as to the arrangement of the ball turning grooves 30a', 30a'', 30b' and 30b''. As shown in FIG. 14, the ball turning grooves 30a', 30a'', 30b' and 30b'' are disposed on the lines Z which intersect the reference lines Y—Y at 60°, the reference line Y—Y themselves intersecting the line X—X of force acting on the track shaft 18 at 30°. The ball turning grooves 30a', 30a'', 30b' and 30b'' extend along the lines Z over substantial lengths. One ends of the ball turning grooves 30a', 30a'', 30b' and 30b'', which may be referred to as starting ends, are positioned in alignment with one ends of corresponding loaded grooves 13 to 16 and 19 to 20 in the bearing races 11 and 12 and in the track shaft 18, while the other ends which may be referred to as terminal ends are aligned with the ends of corresponding non-loaded ball grooves 7 to 10 in the main body 1 of the bearing.

Namely, the ball turning grooves 30a', 30a'', 30b' and 30b'' are communicated at their one ends with the loaded ball grooves 13 to 16 and 19 to 22 and, at their other ends, with the non-loaded ball grooves 7 to 10. Thus, one ends of the loaded ball passages constituted by corresponding loaded ball grooves 13 to 16 and 19 to 20 are connected, through the ball turning grooves, to adjacent ends of corresponding non-loaded ball passages constituted by the non-loaded ball grooves 7 to 10. The other ends of the loaded ball passages are connected to adjacent ends of the non-loaded ball passages through ball turning grooves formed in the other end cover 24 which has an identical construction to the end cover 23. Thus, an endless ball recirculating passage is formed by, for example, the loaded ball passage constituted by the loaded ball grooves 13,19, non-loaded ball passage provided by the non-loaded ball groove 7, and corresponding ball turning grooves formed in both end covers (see FIG. 2).

Semicircular race holding grooves 31 and 32 are formed in the inner surface of the end cover 23. These race holding grooves 31 and 32 have their centers located on the reference lines Y—Y which intersect the line X—X of force acting on the track shaft 18 at 30°, and extend in the recircumferential direction across the ball turning grooves 30a', 30a'' and 30b', 30b'', respectively. Reference numerals 33 and 34 denote retaining grooves formed in the inner surface of the end cover 23. Each retaining groove has a substantially hat-shaped cross-section in the plane perpendicular to the axis of the track shaft 18. The retaining groove 33 has flank portions which extend across the starting ends of the ball turning grooves 30a', 30a''. Similarly, the flank portions of the retaining groove 34 extend across the starting ends of the ball turning grooves 30b' and 30b''. The other end cover 24 also is provided with the race holding grooves 31,32 and the retaining grooves 33,34 formed in the inner surface thereof.

Figure 20:
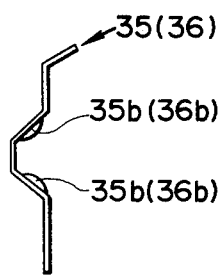
FIG. 20 is a front elevational view of the retainer.
Figure 21:
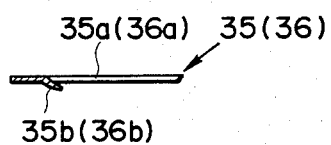
FIG. 21 is a cross-sectional view taken along the line XXI—XXI of FIG. 19.

Referring again to FIG. 2, a pair of retainers 35 and 36 for guiding the rolling of the loaded balls $B_1$ are provided on the inner surfaces of the skirt portions 26 and 27 of the main body 1. As will be seen from FIGS. 20 and 21, the retainers 35 and 36 are formed of steel sheets which are bent to provide hat-shaped sectional shape. The retainers 35 and 36 are provided at their flanks with slits 35a and 36a which are sized so as not to permit the balls to pass therethrough and with tongues 35b,35b and 36b,36b at both ends of the slit 35a and 36a, respectively. These tongues 35b and 36b serve to scoop the balls coming out of corresponding loaded ball passages constituted by the loaded ball grooves 13 to 16 and 19 to 22 and to direct the balls to the associated ball turning grooves 30a', 30a", 30b' and 30b", thereby to ensure the smooth transfer of the balls from the straight loaded ball passages to the curved ball turning grooves.

The retainers 35 and 36 are fixed to both end covers 23 and 24 by being retained at their both ends by the retaining grooves 33,34 in respective end covers 23 and 24. As stated above, the tongues 35b and 36b of the retainers 35 and 36 play an important role of guiding the balls during transfer from the straight loaded ball passages to the curved ball turning grooves and, hence, are required to have substantial strength and stiffness. From this point of view, the retainers 35 and 36 are preferably stiffened by a heat treatment such as tufftride treatment.

In assembling, the retainers 35 and 36 are inserted into the main body 1 of the bearing and are retained at their both ends by the retaining grooves 33 and 34 in the end covers 23 and 24. In this state, the central axes of the slits 35a, 36a are located on the same lines as the centers of the corresponding loaded ball grooves 13 to 16 and 19 to 22.

The operation of the described embodiment of the linear slide bearing is as follows.

The linear slide bearing as a unit is mounted on a track shaft 18 of, for example, machining center (not shown) and a machine is mounted on the main body 1 of the bearing. As the linear slide bearing as a unit is moved forwardly or rearwardly along the track shaft 18, the loaded balls $B_1$, which are clamped between the loaded ball grooves 13 to 16 in the bearing races 11 and 12 and the loaded ball grooves 19 to 22 in the track shaft 18, run in one direction while being guided by the retainers 35 and 36. Then, the loaded balls B are scooped by the tongues 35b,36b on one ends of the retainers 35 and 36 and are introduced by these tongues into the ball turning grooves 30a', 30a", 30b' and 30b" in the end cover 24. Thus, the balls $B_1$ are transferred from the straight portion of the endless recirculating passage to the recircular portion of the same. The balls coming out of the ball turning grooves 30a', 30a", 30b' and 30b" are then introduced into the non-loaded ball grooves 7 to 10 in the main body 1 of the bearing, and run through the non-loaded ball grooves as the non-loaded balls $B_2$. The balls then come into the ball turning grooves 30a', 30a", 30b' and 30b" in the other end cover 23 and, after making a turn along these grooves, run again into the loaded ball passages formed between the loaded ball grooves 13 to 16 in the bearing races 11 and 12 and the loaded ball grooves 19 to 22 in the track shaft 18 to run along these loaded ball passages as the loaded balls $B_1$. The balls are recirculated in rows continuously along the endless ball passages as described, as the linear slide bearing as a unit is moved forwardly or backwardly along the track shaft.

Figure 22:
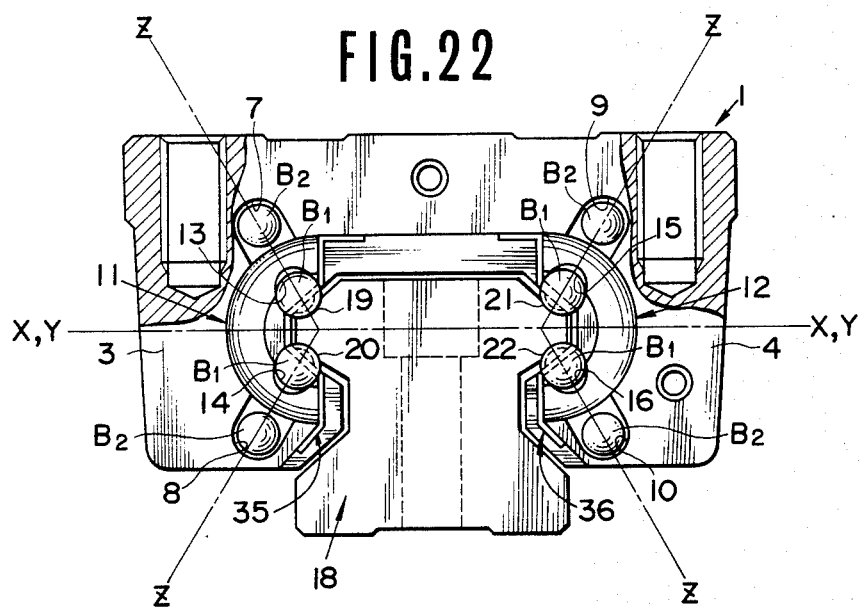
FIG. 22 is a front elevational view of another embodiment of the linear slide bearing in accordance with the invention.

FIG. 22 shows a second embodiment of linear slide bearing in accordance with the invention. In this Figure, the same reference numerals are used to denote the same parts or members as those used in FIGS. 1 through 21.

This embodiment is distinguished from the first embodiment only by the arrangement of ball grooves. Namely, in this second embodiment, assuming a reference line Y—Y coinciding with the line X—X of force acting on the track shaft 18, the non-loaded ball grooves 7 to 10 formed in the main body 1 of the bearing and the loaded ball grooves 13 to 16 and 19 to 22 formed in the bearing races 11 and 12 and in the track shaft 18, respectively, are disposed on lines Z which intersect the reference line Y—Y at 60°. No detailed explanation of other portions will be needed because the other portions are materially indentical to those of the first embodiment.

Figure 23:
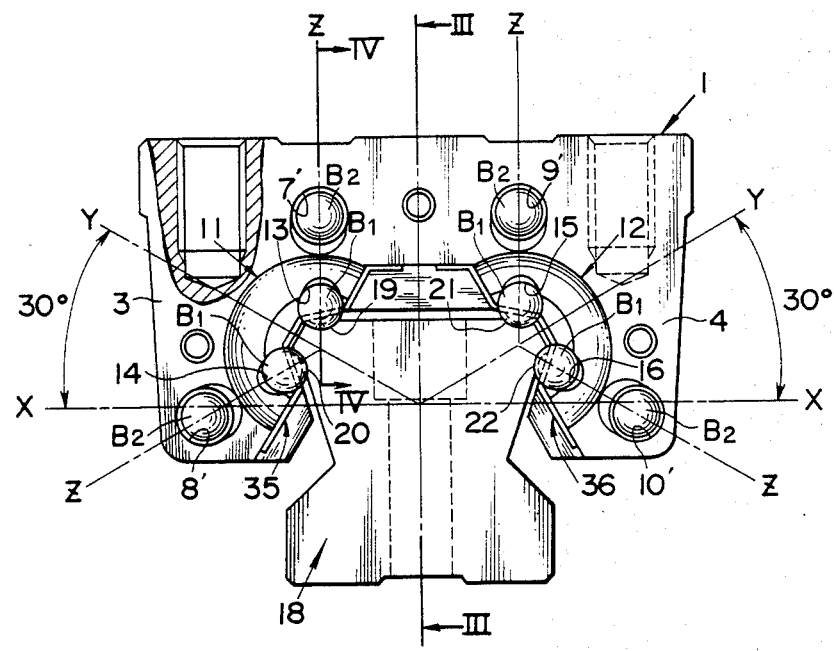
FIG. 23 is a front elevational view of still another embodiment of the linear slide bearing in accordance with the invention.

FIG. 23 shows still another embodiment of the linear slide bearing in accordance with the invention. In this embodiment, the passages for non-loaded balls are constituted by non-loaded ball bores 7' to 10' which are formed in the main body 1 by drilling so as to extend in the longitudinal direction of the main body 1. In this embodiment, therefore, the advantage brought about by the non-loaded ball grooves 7 to 10 in the first and second embodiments cannot be obtained, but the advantages produced by the use of bearing races separate from the main body are still obtainable in this third embodiment. It will be clear to those skilled in the art that this embodiment falls within the scope of the invention.

As will be understood from the foregoing description, the linear slide bearing of the invention offers the following advantages.

It is to be noted that, since the bearing races with loaded ball grooves are formed as separate members from the main body of the linear slide bearing, it is possible to effect the grinding and hardening treatment such as quench-hardening of the ball rolling surfaces of the loaded ball grooves and to enhance the precision of grinding and effect of the hardening treatment thereby to ensure smooth recirculation of balls for a longer period of time.

It is to be noted also that the bearing races made of arcuate members having semi-circlar cross-section exhibits a greater resistance to twisting force even under a heavy load so that the contact pressure between the balls and the loaded ball grooves is maintained constant along the length of the loaded ball grooves. This also contributes to the smooth recirculation of the balls.

In addition, since the bearing races can be correctly positioned and fixed simply by being retained at their both ends by the retaining grooves in the end covers, the mounting of the bearing races is very much facilitated and the troublesome works required by conventional linear slide bearing such as delicate adjustment of tightening force of fixing screws for precisely locating the bearing races can be eliminated.

Furthermore, since the non-loaded ball grooves can be formed by grinding which is much easier to conduct than drilling required by the conventional linear slide bearing. Therefore, the non-loaded ball grooves can be formed at higher precision and in a short period of time, so that the cost of production of the linear slide bearing can be reduced advantageously.

Although the invention has been described through specific terms, it is to be noted here that the described embodiment is not exclusive and various changes and modifications may be imparted thereto without departing from the scope of the invention which is limited solely by the appended claims.

What is claimed is:

1. A linear slide bearing comprising:
an integral main body with a channel-like cross-section constituted by left and right skirt portions and a central cavity formed between said skirt portions, said main body having a pair of race receiving grooves formed in the opposing surfaces of said skirt portions confronting said central cavity and non-loaded ball grooves disposed near both ends of respective race-receiving grooves and communicating with said race-receiving grooves;
a pair of bearing races constituted by arcuate members having a semi-circular cross-section, each of said bearing races being provided in its inner surface with a pair of loaded ball grooves;
a track shaft received in said central cavity of said main body and provided at its both shoulder portions with ribs extending along the length thereof, said track shaft being provided at the upper and lower sides of each rib with loaded ball grooves corresponding to said loaded ball grooves in the adjacent bearing race;
a pair of end covers adapted to be attached to both longitudinal ends of said main body so as to straddle said track shaft, each of said end cover being provided in its inner surface with ball turning grooves for connecting said loaded ball grooves in said bearing races and in said track shaft to corresponding non-loaded ball grooves in said main body, and race retaining grooves for retaining adjacent ends of said bearing races; and
balls adapted to be recirculated through endless ball passages constituted by loaded ball passages formed by said loaded ball grooves in said bearing races and said track shaft, non-loaded ball passages presented by said non-loaded ball grooves in said main body and said ball turning grooves formed in respective end covers.

2. A linear slide bearing according to claim 1, wherein, at each side of the longtudinal axis of said main body, one of said non-loaded ball grooves and said loaded ball grooves associated therewith are arranged in symmetry with the other of said non-loaded ball grooves and the loaded ball grooves associated therewith, with respect to a reference line which intersects the line of force acting on said track shaft at an angle of 30°.

3. A linear slide bearing according to claim 1, characterized by further comprising a pair of retainers, each of said retainers being disposed between said bearing race and said track shaft at each side of said main body and adapted to be retained at its both ends by the inner surfaces of said end covers, each retainer having slits corresponding to the loaded ball grooves in the associated bearing race and in said track shaft.

4. A linear slide bearing according to claim 3, wherein said retainer is provided with tongues at both ends of said slits.

5. A linear slide bearing according to any one of claims 1 to 4, wherein said main body is made of a light-weight synthetic resin.

6. A linear slide bearing according to any one of claims 1 to 4, wherein the angle of contact between each ball and said loaded ball grooves in said bearing race and in said track shaft is selected to be about 45°.

7. A linear slide bearing according to any one of claims 1 to 4, wherein each of said loaded ball grooves formed in said bearing races and said track shaft has a cross-section which is a part of a circle.

8. A linear slide bearing comprising:
an integral main body with a channel-like cross-section constituted by left and right skirt portions and a central cavity formed between said skirt portions, said main body having a pair of race receiving grooves formed in the opposing surfaces of said skirt portions confronting said central cavity and non-loaded ball grooves disposed near both ends of respective race-receiving grooves and communicating with said race-receiving grooves;
a pair of bearing races constituted by arcuate members having a semi-circular cross-section, each of said bearing races being provided in its inner surface with a pair of loaded ball grooves;
a track shaft received in said central cavity of said main body and provided at its both shoulder portions with ribs extending along the length thereof, said track shaft being provided at the upper and lower sides of each rib with loaded ball grooves corresponding to said loaded ball grooves in the adjacent bearing race;
a pair of end covers adapted to be attached to both longitudinal ends of said main body so as to straddle said track shaft, each of said end cover being provided in its inner surface with ball turning grooves for connecting said loaded ball grooves in said bearing races and in said track shaft to corresponding non-loaded ball grooves in said main body, and race retaining grooves for retaining adjacent ends of said bearing races; and
balls adapted to be recirculated through endless ball passages constituted by loaded ball passages formed by said loaded ball grooves in said bearing races and said track shaft, non-loaded ball passages presented by said non-loaded ball grooves in said main body and said ball turning grooves formed in respective end covers;
wherein, at each side of said main body, one of said non-loaded ball grooves and the loaded ball grooves associated therewith are arranged in symmetry with the other of said non-loaded ball grooves and the loaded ball grooves associated therewith, with respect to a reference line which coincides with the line of force acting on said track shaft.

9. A linear slide bearing according to claim 8, characterized by further comprising a pair of retainers, each of said retainers being disposed between said bearing race and said track shaft at each side of said main body and adapted to be retained at its both ends by the inner surfaces of said end covers, each retainer having slits corresponding to the loaded ball grooves in the associated bearing race and in said track shaft.

10. A linear slide bearing according to claim 9, wherein said retainer is provided with tongues at both ends of said slits.

11. A linear slide bearing according to any one of claims 8 to 10, wherein said main body is made of a light-weight synthetic resin.

12. A linear slide bearing according to any one of claims 8 to 10, wherein the angle of contact between each ball and said loaded ball grooves in said bearing race and in said track shaft is selected to be about 45°.

13. A linear slide bearing according to any one of claims 8 to 10, wherein each of said loaded ball grooves formed in said bearing races and said track shaft has a cross-section which is a part of a circle.

* * * * *